United States Patent [19]
Hultgren

[11] 3,730,664
[45] May 1, 1973

[54] MOLD APPARATUS FOR MAKING A CLOSURE CAP

[75] Inventor: Eric Alex Hultgren, Westport, Conn.

[73] Assignee: Eyelet Specialty Company, Wallingford, Conn.

[22] Filed: Nov. 24, 1971

[21] Appl. No.: 201,780

[52] U.S. Cl. .................425/338, 425/441, 264/334
[51] Int. Cl. ................................................B29f 1/14
[58] Field of Search......................425/438, 441, 443, 425/436; 249/59; 264/334

[56] References Cited

UNITED STATES PATENTS

| | | | |
|---|---|---|---|
| 3,584,111 | 6/1971 | Allison | 425/438 X |
| 3,150,222 | 9/1964 | Blaustein | 425/441 X |
| 2,583,093 | 1/1952 | Emmert et al. | 425/438 X |

Primary Examiner—J. Spencer Overholser
Assistant Examiner—David S. Safran
Attorney—Sandoe, Hopgood & Calimafde

[57] ABSTRACT

The invention contemplates a three-part force-plug structure for determining the inner-wall configuration of a cap for removable closure of a bottle or other container, wherein one or more bayonet-type lugs on the cap are relied upon to establish a twist-lock engagement with the container. The three parts are coaxially related and are guided for longitudinal displacement with respect to each other, to determine (a) a first mutual relationship for the molding operation, (b) a second mutual relationship for clearing the molded lug or lugs from axial interference with the force-plug parts, and (c) a third mutual relationship for axially ejecting the molded part. A helically advancing spline formation on the outer cylindrical surface of one of the force-plug parts determines a corresponding spline groove in the molded piece, so that in the course of displacement from the first to the second mutual relationship, the molded piece is necessarily driven in partial rotation, to an extent adequate to clear the molded lug or lugs, for free piece ejection in the course of displacement from the second to the third mutual relationship.

4 Claims, 5 Drawing Figures

Patented May 1, 1973
3,730,664
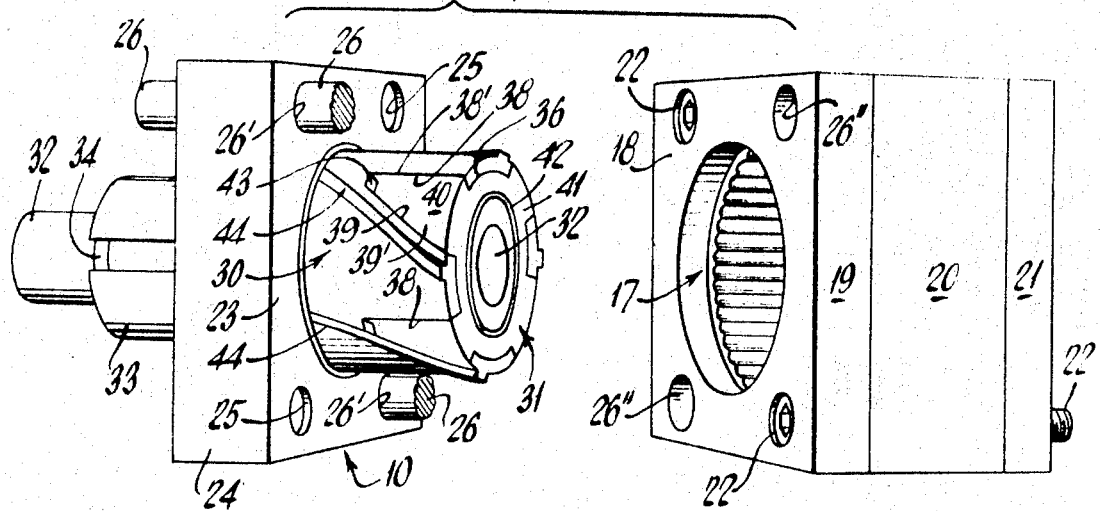
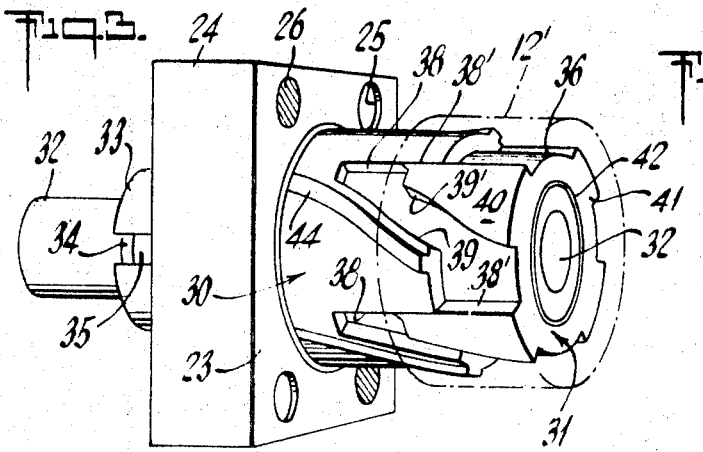
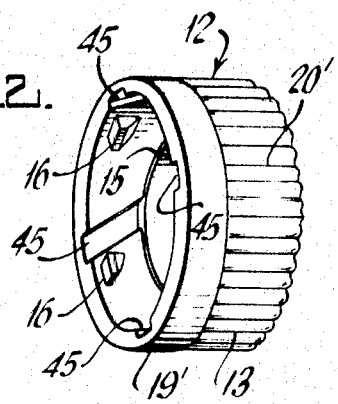
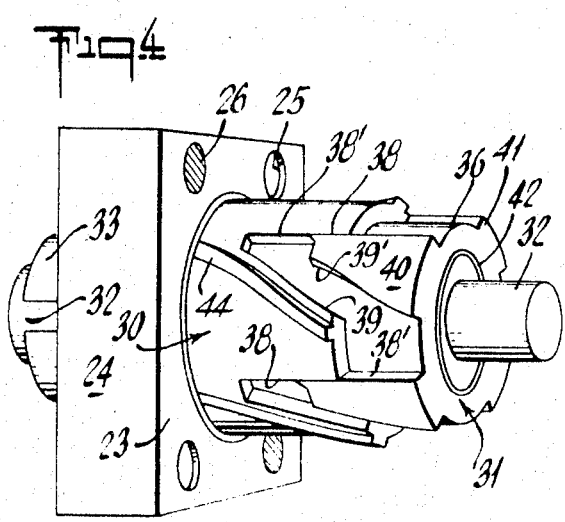
INVENTOR
ERIC ALEX HULTGREN
BY
Sandoe, Hopgood & Calimafde
ATTORNEYS

MOLD APPARATUS FOR MAKING A CLOSURE CAP

The invention relates to molding structure for injection-molding of a closure-cap piece wherein the inner cylindrical wall of the cap is characterized by one or more radially inwardly projecting locking lugs, of relatively small arcuate extent, for bayonet-locking of the cap to its container.

In the past, it has not been possible with simple structure to produce a finished molded cap of the character indicated, without requiring some sort of secondary operation to assure accurate definition of the bayonet lug or lugs. And to produce such a molded piece without secondary operations has required complex force-plug structure wherein the parts of the force plug must be subject to a prescribed and precise succession of relative axial and angular displacements. Such complexities of course become multiplied, in number and in complexity, if applied to multiple-cavity molding operations. The complexities lead to undue cost factors, and to increased likelihood of malfunction.

It is accordingly an object of the invention to provide improved molding apparatus of the character indicated.

Another object is to provide substantial reduction in complexity in the force-plug structure of such apparatus.

A specific object is to provide such force-plug structure in which the need for rotation of force-plug members is completely eliminated.

Still another object is to provide force-plug structure in which a self-camming function is built into a piece-contouring formation, such that purely axial relative displacement of force-plug members effects rotational displacement of the molded piece, to an extent which clears any bayonet lugs from possible interference with force-plug parts, all in the course of piece ejection.

It is a general object to achieve the foregoing objects with basically simple structure which lends itself to repeated automatic multiple-cavity molding of the cap piece, in relatively large pluralities for each molding cycle.

Other objects and various further features of novelty and invention will be pointed out or will occur to those skilled in the art from a reading of the following specification in conjunction with the accompanying drawings. In said drawings, which show, for illustrative purposes only, a preferred form of the invention:

FIG. 1 is a simplified perspective view of one set of cavity-forming elements of the invention, the male or force-plug structure being shown (with its parts in a first or retracted position) parted from the female or cavity structure;

FIG. 2 is a perspective view of the cap piece which is produced from the mold elements of FIG. 1;

FIG. 3 is a perspective view of the force-plug structure of FIG. 1, for a second relatively axially displaced relation of parts thereof;

FIG. 4 is a view similar to FIG. 3, for a third relatively axially displaced relation of the parts; and FIG. 5 is a simplified diagram to indicate the phasing of relative axial displacement of force-plug parts, in the course of a cycle of force-plug operation.

Referring to FIGS. 1 and 2, the invention is seen in application to male and female mold structure 10–11 for injection-molding a finished peice 12, as with a suitable plastic such as polyethylene, polypropylene, etc. The piece 12 may be the closure cap for a bottle or other container and is characterized by a body 13 having a generally cylindrical bore 14 that is closed at one end and open at the other end. As shown, the body or skirt 13 is also cylindrical and has external flutings for better finger-grasping, and the closed end carries an integral internal sealing sleeve 15, coaxial with bore 14 and projecting part of the axial distance toward the open end. Also integrally formed in the wall of bore 14 are plural bayonet-type lugs, used to secure the cap to its container, in a partial-rotation manipulation. Each lug 16 projects radially inwardly, near the open end of the cap, and is of relatively small arcuate extent, such that the combined effective angular width of all lugs 16 is less than one half the full circumferential extent of the bore 14.

The cavity structure 11 is shown as a built-up rectangular prismatic body having a concavity 17 which opens normal to one face 18. The body may comprise aligned body plates or elements 19–20–21, secured and aligned by suitable means (not shown), and bolts, suggested at 22, may serve to secure the cavity structure 11 in a mold clamp (not shown). The plate 19 may, for example, have a smooth bore (which determines the smooth band 19' at the open end of cap 12); the plate 20 may have a bore characterized by corrugations (which determine the flutings 20' of the cap body); and the plate 21 may, in addition to the sleeve projection 15, have a central sprue aperture (not shown) in alignment with the axis of cavity 17.

The force-plug structure 10 may likewise be carried by and project forward of the clamping face 23 of a rectangularly prismatic body 24, having provision at 25 for bolting to the mold clamp. Other parts of the clamp may include spaced guide rods 26 passing through aligned guide bores 26'–26'' in the mold body parts, to assure axial register of force-plug 10 and cavity 11 structures both when the mold clamp is set (with face 17 clamped against the corresponding adjacent body face 23) and when it is open (with faces 17–23 separated sufficiently to permit finished-piece ejection).

Basically, the force-plug structure comprises an outer-ring member 30, an inner-ring member 31, and an ejector-pin member 32. These three members are coaxially related and guided, to achieve and axially move between three basic positional relationships, respectively shown in FIGS. 1, 3 and 4, as will later be more fully explained.

The outer-ring member 30 may be part of or secured to body 24 and will be understood to have a central bore (not shown) for axially reciprocated guidance of the cylindrical tail or stem 33 of the inner-ring member 31; a groove 34 and key 35 in stem 33 enables a nonrotative and thus purely axial character for such guidance. The forward end of ring member 30 is counterbored to receive the similarly enlarged headed end of ring member 31, the substantial coincident cylindrical curvatures of these counterbore and headed formations being visible at 36 in FIG. 1. The forward end of each ring member is further characterized by interfitting V-shaped groove and rib formations, in number corresponding to the number of locking lugs 16 to be formed in cap 12. As shown, each V-groove in outer ring 30 is defined by a first straight wall 38 in a plane which includes the central axis and by a second wall 39 which diverges from wall 38 in the forward direction, the divergence being on a helical path; the helical path may diverge at about 20° from wall 38 for the four-lug cap 12 configuration shown. Correspondingly, each V-rib formation 40 on the headed end of inner-ring member 11 is characterized by angularly spaced walls 38'-39' to match and nest with adjacent groove walls 38-39 when in the retracted position shown in FIG. 1; also, when in said retracted position, the forward or axial end faces of ring members 10-11 and of pin member 32 lie in a smooth surface, by which the inner surface of the closed end of cap 12 is to be determined, it being understood that the front face 41 of the inner-ring member 11 is cut with an annular sleeve-forming groove or recess 42. The V-ribs 40 match the V-grooves in all respects except axial length, the ribs 40 being terminated just short of the convergent inner end of the V-grooves, to establish local lug-defining cavities, designated generally 43 in FIG. 1.

Not only do walls 38-39 fit closely with walls 38'-39' in the FIG. 1 position, but the outer arcuate profiles of ribs 40 lie in the same geometric cylinder as does the cylindrical outer surface of ring 30. Finally, the outer surface of ring 30 is characterized by one or more integral narrow spline-forming helical ridges 44, elevated slightly radially outwardly of the indicated outer cylindrical surface; each ridge 44 is shown to be closely adjacent a helical wall 39 of a V-groove. In a typical employment, for a force-plug outer cylindrical surface of ¾-inch diameter, the ridge 44 is about 0.10-inch wide and rises about 0.01 inch radially outward of the indicated cylindrical surface, thus accounting for a corresponding helical spline-groove formation 45 is the cap bore 14; it will be understood that the ridge height (0.01 inch) is selected to be materially less than skirt thickness at 13, so as to not substantially weaken the cap body.

The operation of the described mold structure will be better understood in conjunction with the displacement diagram of FIG. 5, wherein a cycle of force-plug operation is integrated into a molding cycle, from time $T_o$ to time $T_1$. The inner-ring member cycle and the ejection-pin cycle are separately shown by curves A and B, to the same time scale as the overall injection-molding cycle, typified by the indicated cycle of mold-clamp action. Upon withdrawal of the force-plug structure 10 from the cavity structure 11 the piece 12 is carried by the force-plug structure 10, to clear the cavity structure 11; this event is suggested at 50 in the cycle of FIG. 5 by the down slope of curve C, being that of mold and clamp opening. The inner-ring and pin members 31-32 are thereupon actuated (by suitable program means, no shown), as indicated by the concurrent advancing rises 51-52 of curves A and B. The inner-ring displacement (curve A) reaches its peak while curve B is still advancing; this intermediate condition is that depicted in FIG. 3, by which time spline reaction to longitudinal advance has partially rotated the piece 12', sufficient for the lugs 16 to longitudinally clear force-plug parts. Continued advance of pin 32 continues the spline reaction until piece 12' clears the outer-ring member 30, and the instant $T_e$ at which piece 12' clears the inner member 31 is identified in FIG. 5. Upon ejection from the inner-ring member 31, piece 12' may be dropped for accumulation with other finished pieces.

The invention will be seen to have achieved all stated objects with basically simple structure, involving an actuating program that is the essence of simplicity. With such a simple program sequence, the invention will be seen to lend itself to multiple-cavity molds, involving large pluralities of structural pairs 10-11, served by a common runner system and by a common force-plug actuator system. A great variety of molded-piece configurations can be served by the invention, both with and without such internal surface or projecting features as the integral sleeve 15.

While the invention has been described in detail for the preferred form shown, it will be understood that modifications may be made without departing from the invention.

What is claimed is:

1. Apparatus for injection-molding of a cup-shaped closure cap having a skirt extending from a closed axial end to an open axial end, and with a radially inward retaining lug of relatively small arcuate extent formed integrally with said skirt near the open end and spaced from the closed end, said apparatus comprising: cavity-mold structure presenting at one face a cavity for determining the external contour of said skirt and closed end, and force-plug structure adapted to fit the cavity face of said cavity-mold structure for determining the internal contour of said skirt, lug, and closed end; said force-plug structure comprising: an outer-ring member, an inner-ring member longitudinally and coaxially guided within said outer-ring member and keyed against rotation with respect thereto, and an ejector-pin member longitudinally guided within said inner-ring member; said members in a retracted position having axial-end face formations coacting to determine the inside contour of the closed end of the cap, and said ring members having further generally cylindrical external surface formations coacting to determine the lug and other inside contour of said skirt; said external surface formations comprising a helical spline formation in said outer-ring member, whereby a molded cap will be characterized by spline-tracking formation, a concave generally V-shaped formation in said outer-ring member and characterized by increased arcuate extent in its divergence in the direction of said end-face formations, a convex generally V-shaped formation on said inner-ring member and matching said concave formation to an axial extent short of the axial inner limit of said concave formation, whereby in said retracted position a lug-defining cavity is established at the axially inner ends of said concave and convex formations; at least one pair of adjacent matched edges of said concave and convex formations being characterized by a net angular offset between axial inner and outer limits, said offset being in the direction of helical-spline advance and of magnitude exceeding the effective angular extent of the lug-defining cavity; whereby, upon molding with the force-plug structure positioned in said cavity-mold structure, the molded cap is removed with the force-plug structure and with the force-plug members in retracted position, and further whereby upon a first axially outward displacement of said inner-ring member with respect to said outer-ring member, the molded cap is cammed in partial rotation as it tracks said spline formation to the extent of clearing the lug from interference with said inner-ring member, so that in a second axially outward displacement of said ejector pin beyond the displaced inner ring, the molded cap will continue to track said spline formation until stripped of said outer-ring member and will thereafter strip readily from said inner-ring member.

2. Apparatus according to claim 1 for molding a cap in which the radially inward lug is one of a plurality of equally angularly spaced lugs, and in which the combined effective angular extent of the plurality of lugs is less than half the full circumferential extent of said skirt, said apparatus further comprising: said ring members having said external surface formations in multiple equal to and spaced in accordance with said plurality.

3. Apparatus according to claim 1, in which said spline formation is angularly adjacent said one angularly offset edge of said outer-ring member.

4. Apparatus according to claim 1, in which the other pair of adjacent matched edges of said concave and convex formations extends substantially parallel to the guide axis of said ring members.

* * * * *